United States Patent
Schomerus et al.

(10) Patent No.: US 11,823,305 B2
(45) Date of Patent: Nov. 21, 2023

(54) METHOD AND DEVICE FOR MASKING OBJECTS CONTAINED IN AN IMAGE

(71) Applicant: Volkswagen Aktiengesellschaft, Wolfsburg (DE)

(72) Inventors: Volker Patricio Schomerus, Braunschweig (DE); Juncong Fei, Karlsruhe (DE); Umair Rasheed, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 174 days.

(21) Appl. No.: 17/600,202

(22) PCT Filed: Mar. 4, 2020

(86) PCT No.: PCT/EP2020/055756
§ 371 (c)(1),
(2) Date: Sep. 30, 2021

(87) PCT Pub. No.: WO2020/200620
PCT Pub. Date: Oct. 8, 2020

(65) Prior Publication Data
US 2022/0180616 A1   Jun. 9, 2022

(30) Foreign Application Priority Data
Apr. 1, 2019 (DE) .................. 10 2019 204 602.9

(51) Int. Cl.
*G06T 11/00* (2006.01)
*B60R 1/22* (2022.01)
(Continued)

(52) U.S. Cl.
CPC ............... *G06T 11/00* (2013.01); *B60R 1/22* (2022.01); *G06V 10/34* (2022.01); *G06V 20/56* (2022.01);
(Continued)

(58) Field of Classification Search
CPC . G06T 11/00; G06T 5/005; G06T 7/12; G06T 19/006; G06T 1/00; G06T 2200/28;
(Continued)

(56) References Cited

U.S. PATENT DOCUMENTS 6,553,131 B1   4/2003   Neubauer et al. ............. 382/105
7,817,190 B2   10/2010   Seo et al. .................... 348/230.1
(Continued)

FOREIGN PATENT DOCUMENTS

| EP | 2876605 A1 | 5/2015 | ............. G06T 11/60 |
| WO | 2009/061174 A1 | 5/2009 | ............. G01C 11/02 |
| WO | 2020/200620 A1 | 10/2020 | ............. G06K 9/00 |

OTHER PUBLICATIONS

German Office Action, Application No. 102019204602.9, 5 pages, dated Feb. 27, 2020.
(Continued)

*Primary Examiner* — Nimesh Patel
(74) *Attorney, Agent, or Firm* — Slayden Grubert Beard PLLC

(57) ABSTRACT

A method for masking objects contained in an image is provided, wherein pixel values are determined for pixels of an image. An image mask is generated, which comprises at least one first region in which pixels of a predefined object class are arranged and at least one second region in which pixels of said predefined object class are not arranged. The distance to the nearest pixel in the second region is determined for pixels in the at least one first region. Pixels in the at least one first region are assigned a window that has a
(Continued)

window size that depends on the determined distance. At least one new pixel value is determined for a pixel from the pixel values of the pixels within the window assigned to the pixel. The original pixel values of pixels in the one first region are replaced with the respective new pixel values.

20 Claims, 4 Drawing Sheets

(51) Int. Cl.
    *G06V 20/58*     (2022.01)
    *G06V 40/16*     (2022.01)
    *G06V 10/34*     (2022.01)
    *G06V 20/56*     (2022.01)
    *G06V 20/62*     (2022.01)

(52) U.S. Cl.
    CPC .............. *G06V 20/58* (2022.01); *G06V 40/16* (2022.01); *G06V 40/161* (2022.01); *G06V 20/625* (2022.01)

(58) Field of Classification Search
CPC . G06T 2207/10016; G06T 2207/10028; G06T 7/0002; G06T 7/20; B60R 1/22; B60R 25/25; B60R 25/305; B60R 25/252; B60R 25/30; B60R 1/081; B60R 2300/802; B60R 25/20; B60R 2011/0003; B60R 2300/105; B60R 25/04; B60R 25/33; B60R 7/04; G06V 10/34; G06V 20/56; G06V 20/58; G06V 40/16; G06V 40/161; G06V 20/625; G06V 40/168; G06V 40/172; G06V 20/20; G06V 20/52; G06V 20/597; G06V 40/193; G06V 40/20; G06V 10/20; G06V 2201/08; G06V 40/174; G06V 40/197; G06Q 30/0645; G06Q 20/40145; G06Q 30/0284; G05D 1/0088; G05D 2201/0213; G05D 1/0214; G05B 13/0275; G05B 19/106; G05B 23/0218; G07C 9/00563; G07C 9/00571; G07C 5/0891; G07C 9/37; G07C 5/008; G07C 1/10; G07C 5/0866; G07C 5/0858; G07C 9/32; G07C 9/38; G06F 18/24; G06F 16/90344; G06F 3/013; G06F 3/011; G06F 18/22; G06F 18/2413; G06F 21/32; G06F 18/217; G06F 2203/011; B60K 35/00; B60K 37/06; B60K 2370/175; B60K 28/063; B60K 2370/113; B60K 2370/1442; B60K 28/06; B60K 28/066; G08G 1/00; G08G 1/123; G08G 1/0175; G08G 1/16; G08G 1/017; G08G 1/0962; G08G 1/01; G08G 1/054; G08G 1/0116; G08G 1/09623; G08G 1/166; G08G 1/20

See application file for complete search history.

(56) References Cited

U.S. PATENT DOCUMENTS

| 7,825,950 | B2 | 11/2010 | Rottmann ..................... 348/143 |
| 9,858,696 | B2 | 1/2018 | Gordon et al. |
| 2006/0176319 | A1 | 8/2006 | Ida et al. ....................... 345/629 |
| 2008/0259154 | A1 | 10/2008 | Garrison et al. ............ 348/14.01 |
| 2014/0362163 | A1 | 12/2014 | Winterstein et al. ....... 348/14.07 |
| 2015/0145992 | A1* | 5/2015 | Traff ...................... G06V 20/00 348/143 |
| 2017/0008490 | A1* | 1/2017 | Sako ................... G07C 9/00571 |
| 2017/0161545 | A1* | 6/2017 | Champlin ............ G06V 20/695 |
| 2018/0357480 | A1 | 12/2018 | Bailey et al. |
| 2020/0250833 | A1* | 8/2020 | Takagi ..................... G06T 7/215 |
| 2021/0319229 | A1* | 10/2021 | Subramanian ......... G06V 20/52 |

OTHER PUBLICATIONS

International Search Report and Written Opinion, Application No. PCT/EP2020/055756, 23 pages, dated Jun. 18, 2020.

* cited by examiner

METHOD AND DEVICE FOR MASKING OBJECTS CONTAINED IN AN IMAGE

CROSS-REFERENCE TO RELATED APPLICATIONS

This application claims priority to German Patent Application No. DE 10 2019 204 602.9, filed on Apr. 1, 2019 with the German Patent and Trademark Office. The contents of the aforesaid patent application are incorporated herein for all purposes.

TECHNICAL FIELD

The present invention relates to a method for masking objects contained in an image, which method may for example be used for automatic yet anonymous image analysis. The present invention also relates to a device for carrying out the method and to a vehicle, which is configured to execute such a method or which comprises such a device.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

When developing automatic driving functions, it is necessary to record, save and process sensor data, for example camera images. The detection and classification of diverse objects in the captured camera images, for example vehicles and pedestrians, may be achieved using learning-based methods.

If the camera images contain faces and motor vehicle license plate numbers, these are personal data, which significantly restricts the sharing of said data for data protection reasons. Prior to sharing, said data must therefore be anonymized, i.e., faces and motor vehicle license plate numbers must be made unrecognizable. This procedure consists of two steps: the detection of faces and motor vehicle license plate numbers in the camera images and making the corresponding image regions unrecognizable.

However, the development and testing of systems for detecting pedestrians and vehicles for automatic driving is rendered more difficult when precisely these objects are made unrecognizable in the data. Learning-based methods such as artificial neural network, for example so-called "deep neural networks" used in the field of object detection, learn how to recognize objects, e.g. pedestrians, with the aid of a large amount of training data, e.g., in the case of pedestrian detection using a plurality of example images with pedestrians. These example images must look as realistic as possible such that the system used may successfully learn the detection task.

The detection of person-related image regions such as faces or motor vehicle license plate numbers may take place in a variety of ways. For example, in the case of manual detection, a person may search through the individual captured images and mark the relevant regions. In the case of video material, however, this method is too laborious given the large number of images captured.

Equally, automatic object detection may take place with the aid of artificial neural networks, wherein bounding boxes delimit image regions classified as faces or motor vehicle license number plates. However, the detected rectangular regions more or less never correspond to the actual object contours, and therefore, in general, more of the image is made unrecognizable than necessary in the subsequent second step. Furthermore, methods for object detection may generally be parameterized such that a balance may be created between "false positives" (a face was detected even though there is no face in the region) and "false negatives" (an existing face was not recognized). From a data protection point of view, all regions should be recognized as reliably as possible (as few "false negatives" as possible). From the point of view of further data processing steps (object recognition for automatic driving functions), as few image regions as possible should be distorted, i.e., as few "false positives" as possible.

Various methods are also known for making the detected image regions unrecognizable. For example, the detected regions may be covered with monochromatic, e.g., white or black, boxes or bars.

Equally, the relevant regions may be blurred, wherein the corresponding regions are artificially "smudged" by replacing pixel values of an image point, i.e., the color values or gray value in a gray value image, with the average value of the pixel values of multiple image points in a rigidly defined area surrounding the image point, e.g., in an image section measuring 5×5 pixels. As a result, contours and edges are toned down in the corresponding region.

Additionally, "pixelation" of the detected image regions may be carried out, wherein the color values of all pixels within a defined window are replaced with a common value, for example their average value. As a result, the image resolution in the corresponding region is reduced, since multiple pixels are merged into one pixel.

SUMMARY

A need exists to provide an improved method and an improved device for masking sensitive image regions.

The need is addressed by a method and a corresponding device according to the independent claims. Embodiments of the invention are described in the dependent claims, the following description, and the drawings.

DESCRIPTION

Figure 1:
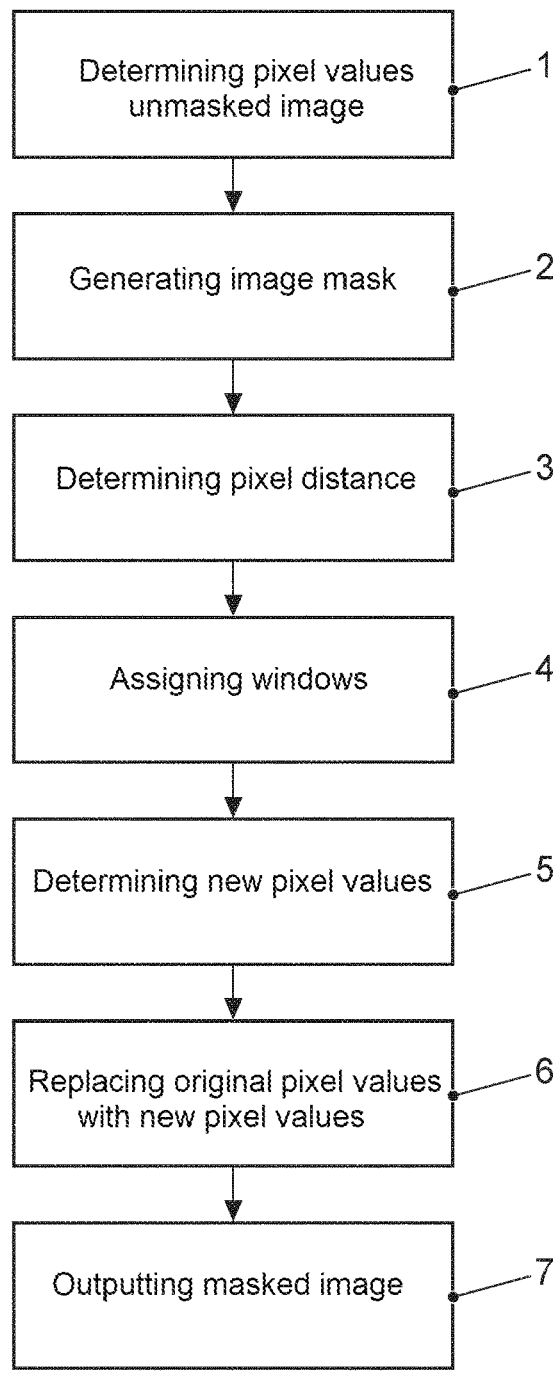
FIG. 1 schematically shows a flow chart of an embodiment of a method for masking objects contained in an image.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The teachings herein are based on the recognition that making image regions unrecognizable leads to a loss of information and to distortion of the object properties. If, for example, a system for detecting pedestrians were trained based on camera images in which all faces were replaced by white boxes, this system would learn to always recognize a pedestrian where there is a white rectangle in the image, and thus would not work in reality. Furthermore, it has been found that learning-based methods react sensitively to edges and color transitions in the image and although edges that help with object detection are removed in the above-described methods for rendering objects unrecognizable, new edges are incorrectly generated in the image. This may cause the corresponding system to react to false features. This also applies to blurring of the relevant image regions, wherein a sharp edge between the blurred region and the rest of the image is created.

In a method according to a first exemplary aspect for masking objects contained in an image,
  pixel values are determined for the pixels of an image;
  an image mask is generated, which comprises at least one first region, in which pixels of a predefined object class are arranged, and at least one second region, in which pixels of said predefined object class are not arranged;
  the distance to the nearest pixel in the at least one second region in each case is determined for the pixels in the at least one first region;
  the pixels in the at least one first region are each assigned a window that has a window size that depends on the determined distance;
  at least one new pixel value is determined for each pixel from the pixel values of the pixels within the window assigned to the relevant pixel; and
  the original pixel values of the pixels in the at least one first region are replaced with the respective new pixel values.

In this way, detection and masking objects that is accurate with regard to contours is carried out, wherein no additional edges or artifacts are created in the image on account of the distance-dependent masking at the edge regions. As such, it is possible, on the one hand, to meet the requirements of data protection and to only share anonymized image data or to save same for analysis and test purposes and, on the other hand, to minimize the influence of the process of making objects unrecognizable to learning-based methods to thus to allow, for example, for the development of reliable safety-critical systems for detecting pedestrians and vehicles.

In some embodiments, the determined distance indicates the number n of pixels in the first region to the nearest pixel in the second region in each case, wherein the window size is n×n and the window assigned to a pixel in each case comprises said pixel and (n×n)−1 neighboring pixels.

For example, for a distance n=1, the new pixel value of a pixel corresponds to the original pixel value of the pixel, wherein, for a distance n>1, the new pixel value is calculated from the original pixel values of the n×n pixels.

For example, for a distance n>1, the new pixel value is calculated from an average value of the original pixel values of the n×n pixels.

For example, for a distance n=2, the new pixel value of the pixel may be calculated from the average value of the original pixel values of the pixel, of the pixel arranged immediately to the left, of the pixel arranged immediately above, and of the pixel that is arranged both immediately above the pixel arranged to the left and immediately to the left of the pixel arranged above.

Person-related objects may be detected in an accurate manner with regard to contours and said person-related objects are anonymized by means of masking.

For example, the person-related objects may be motor vehicle license plate numbers and/or human faces.

In some embodiments, image data containing person-related objects are output to an artificial neural network.

In some embodiments, image data containing person-related data are recorded by a camera of an autonomously driving motor vehicle and stored in the motor vehicle.

In a second exemplary aspect, a device for masking objects contained in an image comprises a camera that outputs pixel values for the pixels of a captured image to an image processing unit, wherein the image processing unit
  generates an image mask that comprises at least one first region in which pixels of a predefined object class are arranged, and at least one second region in which pixels of said predefined object class are not arranged;
  determines the distance to the nearest pixel in the at least one second region in each case for the pixels in the at least one first region;
  assigns each of the pixels in the at least one first region a window that has a window size that depends on the determined distance;
  determines at least one new pixel value for each pixel from the pixel values of the pixels within the window assigned to the relevant pixel; and
  replaces the original pixel values of the pixels in the at least one first region with the respective new pixel values.

The teachings herein also relate to a motor vehicle, in which a method or a device according to the teachings herein is used.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 schematically shows a flow chart of a method for masking objects contained in an image, which method may for example be used for automatic yet anonymous image analysis. The following explanations relate to an individual image, but typically said image will be part of an image sequence or video sequence. Furthermore, the detection and masking of faces and motor vehicle license plate numbers is given by way of example, but the method is not restricted hereto.

According to method step 1, pixel values for the pixels of an image are initially determined. For this purpose, the image may be captured by means of an image sensor in which a camera may be integrated and which generates a plurality of image points or pixels in a rectangular image matrix for the image. The image may be a color image, for example an RGB signal, wherein color values exist for the individual pixels in each case for the three primary colors: red, green and blue. Equally, the image may be a gray value image, wherein a gray value exists in each case for the individual pixels. By means of the image sensor, visible light, for example, or alternatively or additionally infrared light may be detected. However, it is also conceivable to process the signals of sensors that are not based on the detection of light but that have a sufficient spatial resolution in order to be able to provide data protection-relevant information.

In the following method step 2, detection of objects in the relevant image by means of so-called "semantic pixel labeling" in a manner that is accurate with regard to contours takes place. Each pixel of the image is assigned to one of multiple predefined object classes. For example, in the field of automatic driving, it may be established whether image points belong to object classes such as "car", "road", "pedestrian", "cyclist", "car occupants", "building". This minimizes "false negatives", such that no relevant object is missed, wherein "false positives", i.e. the recognition of an object even though there is nothing at this location, generally occurs rarely, and as such distortion hardly ever happens.

Special object classes for the sub-objects "face" and "motor vehicle license plate number" are used for the anonymization of faces and motor vehicle license plate numbers, which special object classes are not used for conventional segmentation for object recognition in automatic driving. In a first step, the pixels are assigned to the conventional object classes "car", "pedestrian", "cyclist", "car occupant" and, in a second step, some of the pixels of said object classes are assigned to one of the special object classes for "face" and "motor vehicle license plate number". The result of this detection is then an image mask that indicates whether or not a pixel belongs to a face or a motor vehicle license plate number. The image mask thus takes the form of a binary image, in which white pixels or pixels with a first binary value, e.g. "1", indicate that the corresponding pixel of the image is assigned to the object class for "face" or "motor vehicle license plate number" and black pixels or pixels with a second binary value, e.g. "0", indicate that the corresponding pixel of the image is not assigned to these object classes.

In the following method step 3, the distance from each pixel of one class, in the present example the white pixels of the image mask, to the nearest pixel of the other class, in the present example the black pixels of the image mask, is calculated using a distance transformation. In this way, the number of pixels by which each pixel that belongs to a motor vehicle license plate number is remote from a background pixel is calculated, for example.

Subsequently, in method step 4, the pixels of the object class "face" or "motor vehicle license plate number" are each assigned a window. Here, no rigidly defined window size is used, but rather the size of the window is selected depending on the determined distance for each pixel. The window size is selected such that the only pixel values of the regions to be anonymized and not of the background are used for the subsequent masking. A pixel at a distance from the background of n pixels is for example assigned a window size of n×n pixels. As such, for a pixel exactly on the edge of a region to be anonymized and thus at a distance of one pixel from the background, a window size of 1×1 is selected, i.e. the color values or gray value of the pixel is not changed. A pixel at a distance from the background of 2 pixels is assigned a window size of 2×2 pixels, etc.

In the following method step 5, new pixel values are calculated for the relevant pixel based on the pixel values of the n×n pixels in the assigned window. The arithmetic mean value of the pixel value of the n×n pixels may for example be calculated in this case. Equally, however, the median of the pixel values may also be determined, for example. It is also possible for not all pixel values within the window in question to be taken into consideration in the calculation or for them to have a different weighting.

The original pixel values are then replaced with the respective new pixel values in method step 6 and, if applicable, output for further processing in method step 7.

Figure 2:
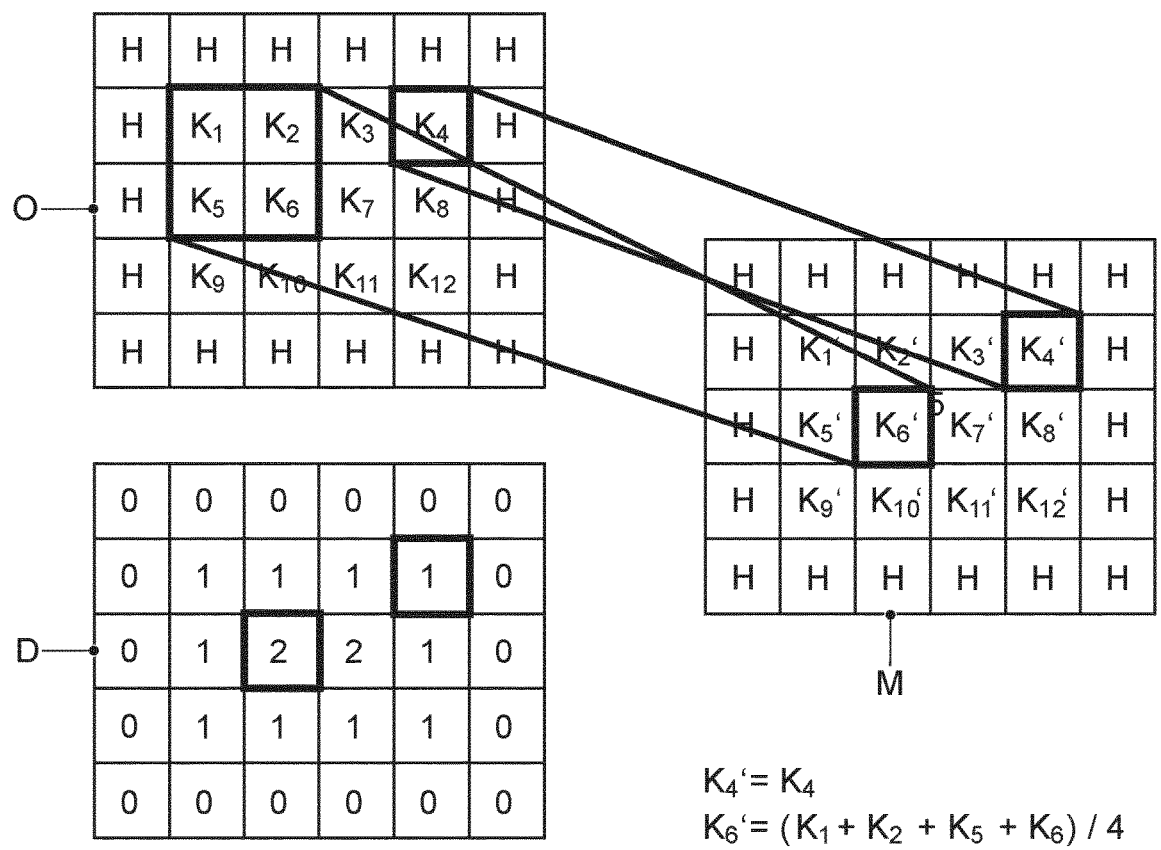
FIG. 2 schematically shows an exemplary calculation of the distance-dependent masking based on the example of two image points arranged differently.

FIG. 2 schematically shows an example of the distance-dependent masking. An original image O, which here comprises just five image cells each having six pixels or image points for the sake of simplicity, is showing a motor vehicle license plate number in front of a background. The individual pixels of the motor vehicle license plate number and their respective pixel values are denoted here by $K_i$ and are surrounded by pixels H, which represent the background.

The above-mentioned distance transformation then produces the distance field D shown below and indicating the distance to the nearest background pixel for the individual pixels. For the pixel $K_6$, the result is a distance of two pixels, and for the pixel $K_4$, the result is a distance of one pixel. Then, the window size to be used is selected for the individual pixels according to the determined distance, for example a window size of 2×2 pixels for the pixel $K_6$ and a window size of one pixel for the pixel $K_4$.

Then, new pixel values $K_i$ are calculated for the individual pixels of the motor vehicle license plate number from the pixel values of the pixels within the window assigned to the relevant pixel. For the pixel $K_4$, the pixel value remains unchanged on account of the edge location, whereas a changed pixel value in the form of the arithmetic mean of the pixels $K_1$, $K_2$, $K_5$ and $K_6$ results for the pixel $K_6$. In this way, a masked image M that may be used for the anonymization of person-related image regions is produced by means of distance-dependent blurring, wherein the regions on the edge to be anonymized are altered less than in the center.

Figure 3A:
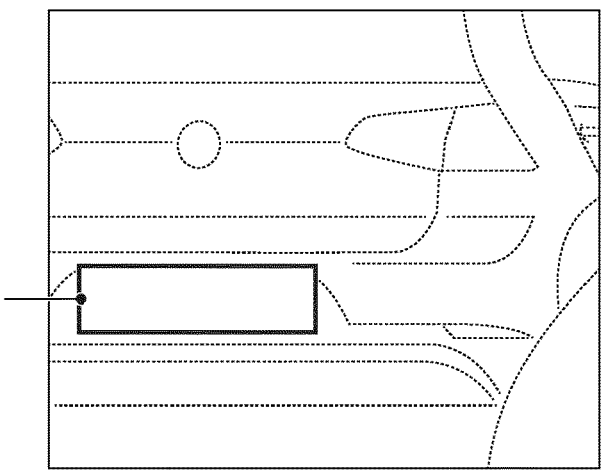
FIGS. 3a-3c show, based on the example of the tail of a motor vehicle, exemplary masking of the motor vehicle license plate number with a white bar (a), with a bar having uniformly blurred image points (b), and with the distance-dependent masking according an embodiment (c)
Figure 3B:
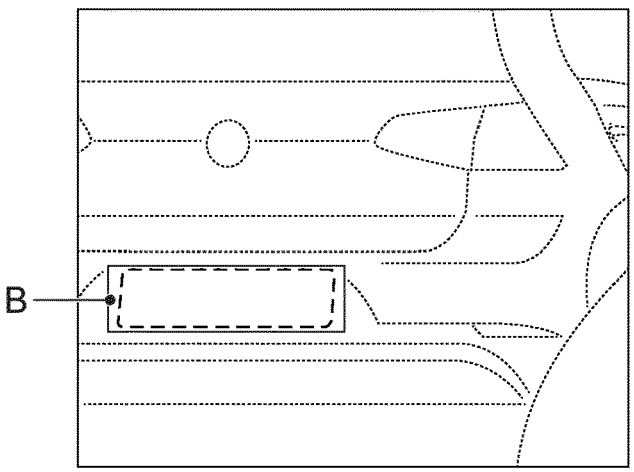
Figure 3C:
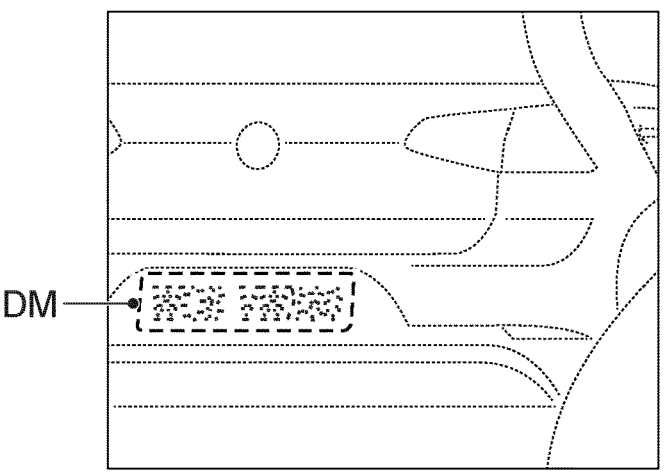
Figure 4A:
FIGS. 4a-4d schematically show, for a street scene with two motor vehicles, an exemplary original image (a) with recognizable motor vehicle license plate numbers, an exemplary binary mask generated therefor (b), an exemplary corresponding distance field (c), and an exemplary anonymized image with the motor vehicle license plate number having been made unrecognizable (d).
Figure 4B:
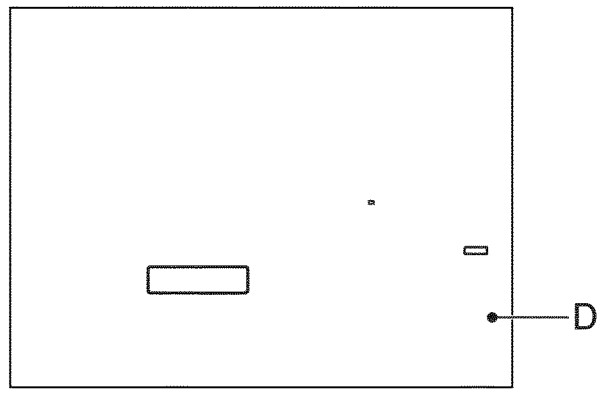
Figure 4C:
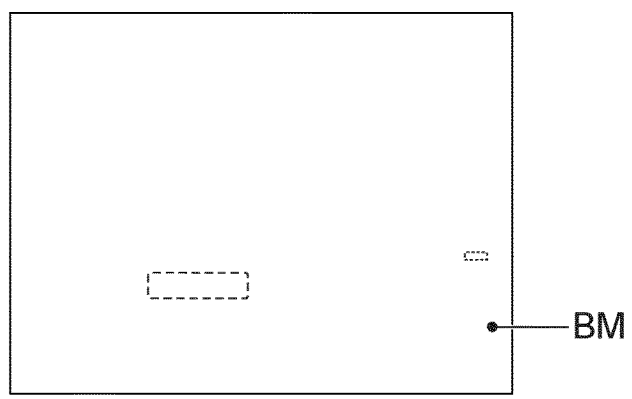
Figure 4D:
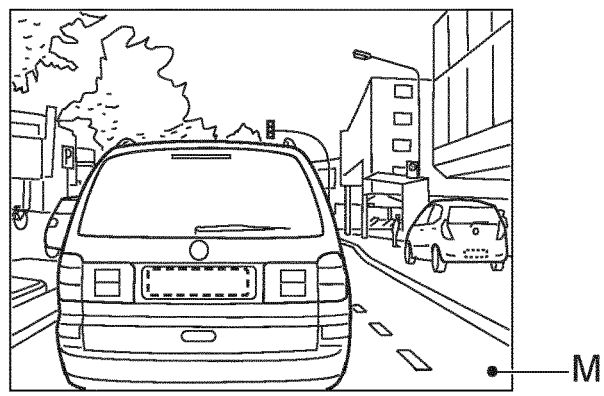

This is demonstrated in FIG. 3 by the example of a motor vehicle license plate number located on the tail of a motor vehicle. For comparison purposes, masking of the motor vehicle license plate number with a white bar B is firstly shown in FIG. 3*a*. In this case, the original outer contours of the motor vehicle license plate number may no longer be discerned. Instead, the outer edge of the superimposed bar may be perceived as the new sharp edge between the masked image region and the background. In FIG. 3*b*, too, a bar is superimposed on the motor vehicle license plate number for the purpose of masking, wherein, by means of uniform blurring of the image points, additionally generated edges may be seen on the edge of the blurred region. In the masking (c) shown in FIG. 3*c*, in which detection of the motor vehicle license plate number that is accurate with regard to contours is carried out with distance-dependent blurring with different window sizes, the original outer object contours are largely preserved yet blurred, but no sharp edges are generated between the masked region and the background.

As such, the negative influence of masking on learning-based object recognition methods may be minimized and, for example, images and video sequences masked in this manner may be shared. This anonymization method is also helpful for the manual viewing of data for analysis and test purposes, because this inconspicuous masking of person-related image regions does not distract from the image regions that are actually to be analyzed.

To illustrate this further, FIG. 4 schematically shows the image processing of a street scene with two motor vehicles. FIG. 4a shows the original image, in which two motor vehicles each having a recognizable motor vehicle license plate number may be seen. The binary mask BM shown in FIG. 4b is generated for this original image, wherein the white image regions correspond to the pixels of the displayed motor vehicle license plate number. The above-mentioned distance transformation produces the distance field shown in FIG. 4c for these pixels. Based on this, the anonymized image shown in FIG. 4d with motor vehicle license plate numbers that have been made unrecognizable is produced by means of the distance-dependent selection of the window sizes and the averaging of the pixel values within the relevant window.

The invention may for example be applied in the field of automatic driving, since it requires image data to be recorded, saved and processed in order to enable a safe driving function. These data are required to develop and test systems for perceiving the surroundings, for example if multiple parties, such as vehicle manufacturers, suppliers and/or research companies, are involved herein.

Furthermore, it may be necessary during operation of automatically driving vehicles to record and save corresponding data in order, for example, to facilitate the presentation of evidence in the event of legal disputes following accidents. For such an application, too, corresponding anonymization of the image data with as little distortion as possible and thus as little information loss as possible is required. However, the invention is not restricted to these applications, and may be used in other fields of automatic yet anonymous image analysis.

LIST OF REFERENCE NUMERALS

1 Determining pixel values, unmasked image
2 Generating image mask
3 Determining pixel distance
4 Assigning windows
5 Determining new pixel values
6 Replacing original pixel values with new pixel values
7 Outputting masked image
O Original image
D Distance field
M Masked image
K, Pixels of motor vehicle license plate number
H Pixels of background
BM Binary mask
B Bar for masking
DM Distance-dependent masking The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for masking objects contained in an image, comprising:
   determining pixel values for the pixels of an image;
   generating an image mask, which comprises at least one first region, in which pixels of a predefined object class are arranged, and at least one second region, in which pixels of said predefined object class are not arranged;
   determining the distance to a respective nearest pixel in the at least one second region for the pixels in the at least one first region;
   assigning the pixels in the at least one first region a window that has a window size that depends on the determined distance;
   determining at least one new pixel value for a pixel from the pixel values of the pixels within the window assigned to the pixel; and
   replacing the original pixel values of the pixels in the at least one first region with the respective new pixel values.

2. The method of claim 1, wherein the determined distance indicates the number n of pixels in the first region to the nearest pixel in the second region, wherein the window size is n×n and the window assigned to a pixel comprises said pixel and (n×n)−1 neighboring pixels.

3. The method of claim 2, wherein, for a distance n=1, the new pixel value of a pixel corresponds to the original pixel value of the pixel, and, for a distance n>1, the new pixel value is calculated from the original pixel values of the n×n pixels.

4. The method of claim 3, wherein, for a distance n>1, the new pixel value is calculated from an average value of the original pixel values of the n×n pixels.

5. The method of claim 4, wherein, for a distance n=2, the new pixel value of the pixel is calculated from the average value of the original pixel values of the pixel, of the pixel arranged immediately to the left, of the pixel arranged immediately above, and of the pixel that is arranged both immediately above the pixel arranged to the left and immediately to the left of the pixel arranged above.

6. The method of claim 5, wherein person-related objects are detected accurate with regard to contours and said person-related objects are anonymized using masking.

7. The method of claim 4, wherein person-related objects are detected accurate with regard to contours and said person-related objects are anonymized using masking.

8. The method of claim 3, wherein person-related objects are detected accurate with regard to contours and said person-related objects are anonymized using masking.

9. The method of claim 2, wherein person-related objects are detected accurate with regard to contours and said person-related objects are anonymized using masking.

10. The method of claim 1, wherein person-related objects are detected accurate with regard to contours and said person-related objects are anonymized using masking.

11. The method of claim 10, wherein the person-related objects are one or more of motor vehicle license plate numbers and human faces.

12. The method of claim 11, wherein image data containing person-related objects are output to an artificial neural network.

13. The method of claim 11, wherein image data containing person-related data are recorded by a camera of an autonomously driving motor vehicle and are stored in the motor vehicle.

14. The method of claim 10, wherein image data containing person-related objects are output to an artificial neural network.

15. The method of claim 10, wherein image data containing person-related data are recorded by a camera of an autonomously driving motor vehicle and are stored in the motor vehicle.

16. A device for masking objects contained in an image, comprising a camera that outputs pixel values for the pixels of a captured image to an image processor, wherein the image processor is configured to:
generate an image mask that comprises at least one first region in which pixels of a predefined object class are arranged, and at least one second region in which pixels of said predefined object class are not arranged;
determine the distance to a respective nearest pixel in the at least one second region for the pixels in the at least one first region;
assign each of the pixels in the at least one first region a window that has a window size that depends on the determined distance;
determine at least one new pixel value for a pixel from the pixel values of the pixels within the window assigned to the relevant pixel; and
replace the original pixel values of the pixels in the at least one first region with the respective new pixel values.

17. A motor vehicle that comprises the device of claim 16.

18. A motor vehicle that is configured to carry out a method comprising:
determining pixel values for the pixels of an image;
generating an image mask, which comprises at least one first region, in which pixels of a predefined object class are arranged, and at least one second region, in which pixels of said predefined object class are not arranged;
determining the distance to a respective nearest pixel in the at least one second region for the pixels in the at least one first region;
assigning the pixels in the at least one first region a window that has a window size that depends on the determined distance;
determining at least one new pixel value for a pixel from the pixel values of the pixels within the window assigned to the pixel; and
replacing the original pixel values of the pixels in the at least one first region with the respective new pixel values.

19. A method for masking objects contained in an image, comprising:
determining pixel values for the pixels of an image;
generating an image mask, which comprises at least one first region, in which pixels of a predefined object class are arranged, and at least one second region, in which pixels of said predefined object class are not arranged;
determining the distance to a respective nearest pixel in the at least one second region for the pixels in the at least one first region;
assigning the pixels in the at least one first region a window that has a window size that depends on the determined distance;
determining at least one new pixel value for a pixel from the pixel values of the pixels within the window assigned to the pixel; and
replacing the original pixel values of the pixels in the at least one first region with the respective new pixel values; wherein
the determined distance indicates the number n of pixels in the first region to the nearest pixel in the second region, wherein the window size is n×n and the window assigned to a pixel comprises said pixel and (n×n)−1 neighboring pixels; and wherein for a distance n=1, the new pixel value of a pixel corresponds to the original pixel value of the pixel, and, for a distance n>1, the new pixel value is calculated from the original pixel values of the n×n pixels.

20. The method of claim 19, wherein, for a distance n>1, the new pixel value is calculated from an average value of the original pixel values of the n×n pixels.

* * * * *